No. 773,569. PATENTED NOV. 1, 1904.
J. HOLMES.
TRAP AND WASTE OUTLET FOR SET TUBS, &c.
APPLICATION FILED OCT. 27, 1903.
NO MODEL.
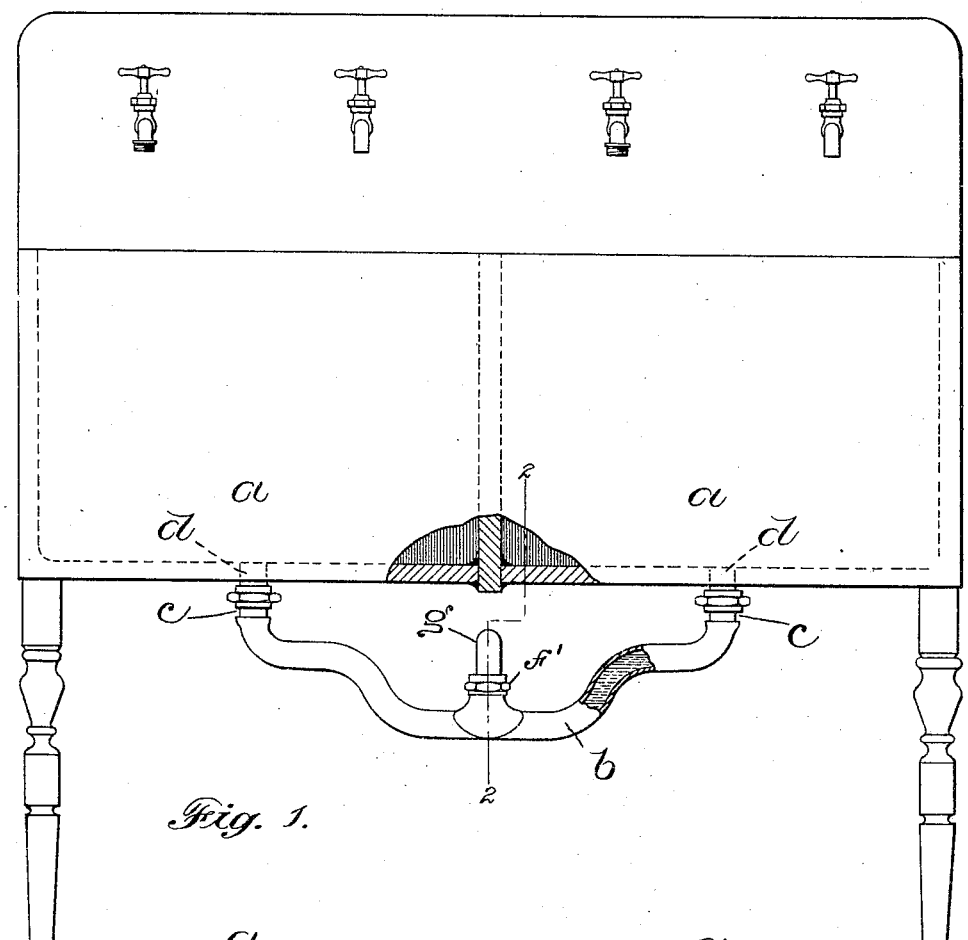
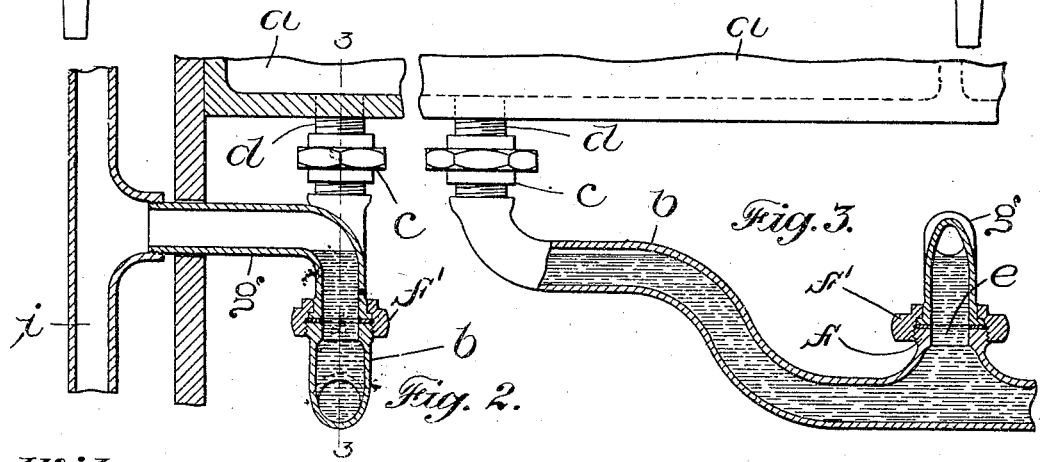
Witnesses:
Fred. E. Dorr.
E. Batchelder
Inventor:
John Holmes
by Wright, Brown & Quinby
attys.

No. 773,569.                                    Patented November 1, 1904.

UNITED STATES PATENT OFFICE.

JOHN HOLMES, OF BOSTON, MASSACHUSETTS.

TRAP AND WASTE-OUTLET FOR SET TUBS, &c.

SPECIFICATION forming part of Letters Patent No. 773,569, dated November 1, 1904.

Application filed October 27, 1903. Serial No. 178,729. (No model.)

*To all whom it may concern:*

Be it known that I, JOHN HOLMES, of Boston, in the county of Suffolk and State of Massachusetts, have invented certain new and useful Improvements in Traps and Waste-Outlets for Set Tubs, &c., of which the following is a specification.

This invention has for its object to provide a simple and effective trap for connecting the outlets of two receptacles, such as a pair of set tubs, with a waste-pipe in such manner as to securely trap the outlet and guard against the admission of sewer-gas.

A further object of the invention is to provide a trap of this character which may be readily varied in length to accommodate the distance between the outlets or holes formed in the bottoms of the two tubs.

The invention consists in the improvements which I will now proceed to describe and claim.

Of the accompanying drawings, forming a part of this specification, Figure 1 represents a front elevation, partly in section, showing a pair of set tubs provided with a trap and waste-outlet embodying my invention. Fig. 2 represents a section on line 2 2 of Fig. 1. Fig. 3 represents a section on line 3 3 of Fig. 2.

The same reference characters indicate the same parts in all the figures.

In the drawings, $a\ a$ represent a pair of set tubs located side by side. My improved trap and waste-outlet comprises a curved body-section $b$, having raised ends which are provided with coupling members $c\ c$ for engagement with the outlets $d\ d$ of the tubs $a\ a$. Said coupling members may be of any suitable construction which will permit the convenient detachable connection of the body-section $b$ with the outlets $d\ d$. The central portion of the section $b$ is depressed below the ends thereof and is provided with an outlet $e$ and with a coupling member $f$, surrounding said outlet. The outlet and coupling member are located below the raised ends of the section $b$. $g$ represents a waste-pipe, which is preferably elbow-shaped, as shown in Fig. 2, the lower end being connected by a coupling-nut $f'$ with the coupling member $f$. The waste-pipe extends upwardly from the joint formed by its receiving end and the outlet $e$ and horizontally rearwardly to communicate with a suitable discharge-pipe $i$.

It will be seen that the joint between the outlet $e$ and the waste-pipe is considerably lower than the ends of the section $b$ and lower than the highest part of the waste-pipe, so that a sufficient quantity of liquid is entrapped to rise above the said joint and prevent the escape of sewer-gas thereat, any imperfection at said joint being indicated by leakage of water instead of sewer-gas.

Owing to the fact that the waste-pipe $g$ extends horizontally after rising from the joint which connects it with the trap, I avoid all liability of emptying the trap by siphonage, although the couplings $c$ and the outlets $d$ of the tubs are at substantially the same height. Since the two outlets $d$ are both at the bottoms of the tubs and in the same plane or at the same height, there could be no entrance of air through either one of them to break a siphonage starting in the trap until so much liquid in the trap had been withdrawn as to destroy the seal. The horizontal portion of the waste-pipe prevents the siphoning of the trap.

The improved trap is not only simple and effective, but presents a very neat and symmetrical appearance.

The described trap presents a continuous passage having no pockets in which deposits can lodge. Hence the trap is kept clean by the flushing action of the liquid passing through it.

The trap besides being neat and symmetrical in appearance is very compact and reduces to the minimum the extent of pipe which is exposed above the level of the water standing in the trap. The portions of pipe between the tub-outlets and the water standing in the trap are the portions which become most quickly fouled, and these portions in my improved trap are very short, as shown in Fig. 3.

The body-section $b$ can be readily removed to permit the cleansing of its interior and of the outlets $d\ d$.

The improved trap is very economical in construction.

As is well known, set tubs are usually furnished to plumbers by the manufacturers who work up the stone of which said tubs are usually constructed. It is practically impossible to form the outlets or holes $d\ d$ in the two tubs always at the same distance apart. In order to enable my improved trap with the double connection to be applied by any plumber to the set tubs furnished to him, I form the curved body-section so that it may be readily lengthened or shortened by a simple bending of the said section. The section $b$ is, as usual, made of lead, which is of course ductile and will permit it to be bent. As shown in the drawings, the section $b$ is irregularly curved. By straightening out the curves or by increasing them the ends may be brought nearer together or spread farther apart, so that the couplings $c$, to which the ends of the section $b$ are connected, may be easily fitted to the outlets $d\ d$. Moreover, the structure permits of the curved section being bent laterally, so as to suit the distance at which the tubs may be set from the wall or the distance at which the discharge-pipe $i$ is located behind the wall of the room.

By disconnecting the couplings $c$ and $f$ the trap as a whole may be readily lifted out by hand for cleaning purposes, as will be readily understood.

It is to be further noted that the construction of the trap as a whole is such that when water is flowing out from one of the two tubs it cannot cause any air from the trap to pass into the other tub, for the reason that there is a seal formed each side of the center of the coupling.

I claim—

1. A trap and waste-outlet for set tubs, &c., comprising, first, a body-section of ductile material adjustable in length and provided with coupling members for engagement with tub-outlets, and a central portion depressed below said ends and provided with an outlet and with a coupling member surrounding said outlet, both located below the said raised ends; and secondly, a waste-pipe coupled to and extending above the said outlet.

2. A trap and waste-outlet for set tubs, &c., comprising, first, an irregularly-curved body-section of ductile material having raised ends provided with coupling members for engaging with tub-outlets, said irregularly-curved section enabling the distance between its ends to be varied, and a central portion depressed below said ends and provided with an outlet and with a coupling member surrounding said outlet, both located below the said raised ends; and secondly, a waste-pipe coupled to and extending above the said outlet, the joint between the waste-pipe and outlet being below the raised ends of the body-section and below the widened portion of the waste-pipe.

In testimony whereof I have affixed my signature in presence of two witnesses.

JOHN HOLMES.

Witnesses:
C. F. BROWN,
E. BATCHELDER.